July 8, 1924.
D. A. HOWELL
1,500,939
EGG CRATE UNPACKING AND REPACKING APPARATUS
Filed March 20, 1923    2 Sheets-Sheet 2
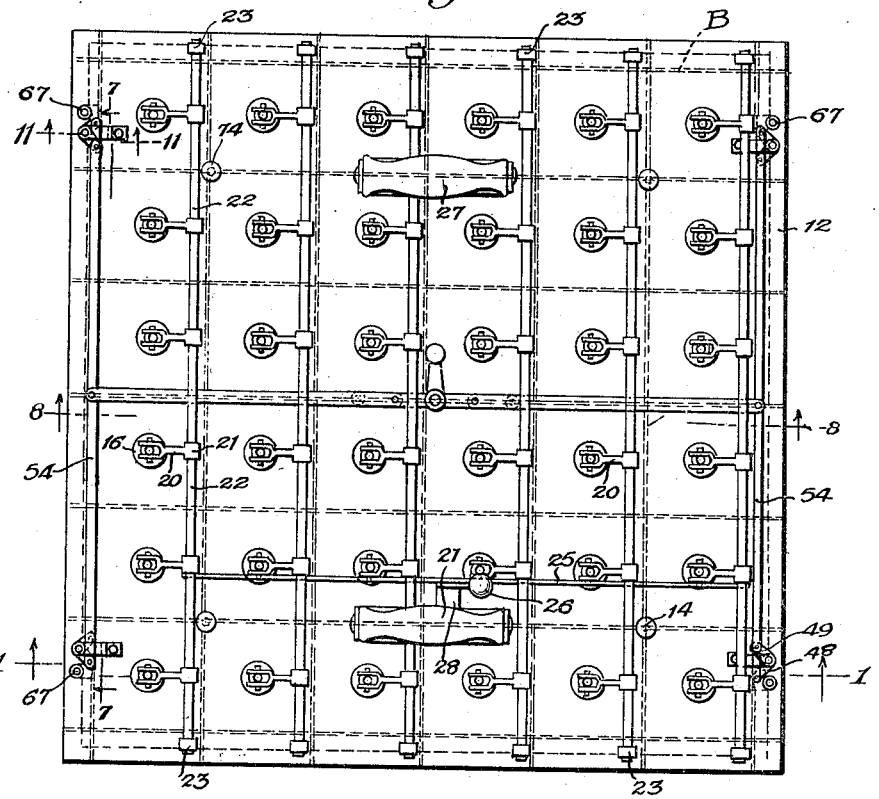
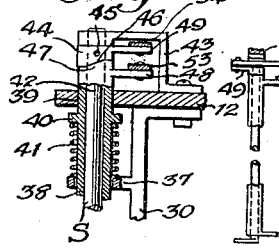
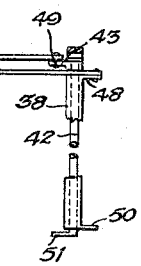
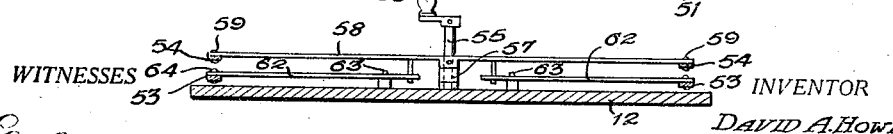
WITNESSES
INVENTOR
DAVID A. HOWELL
BY
ATTORNEYS Patented July 8, 1924.

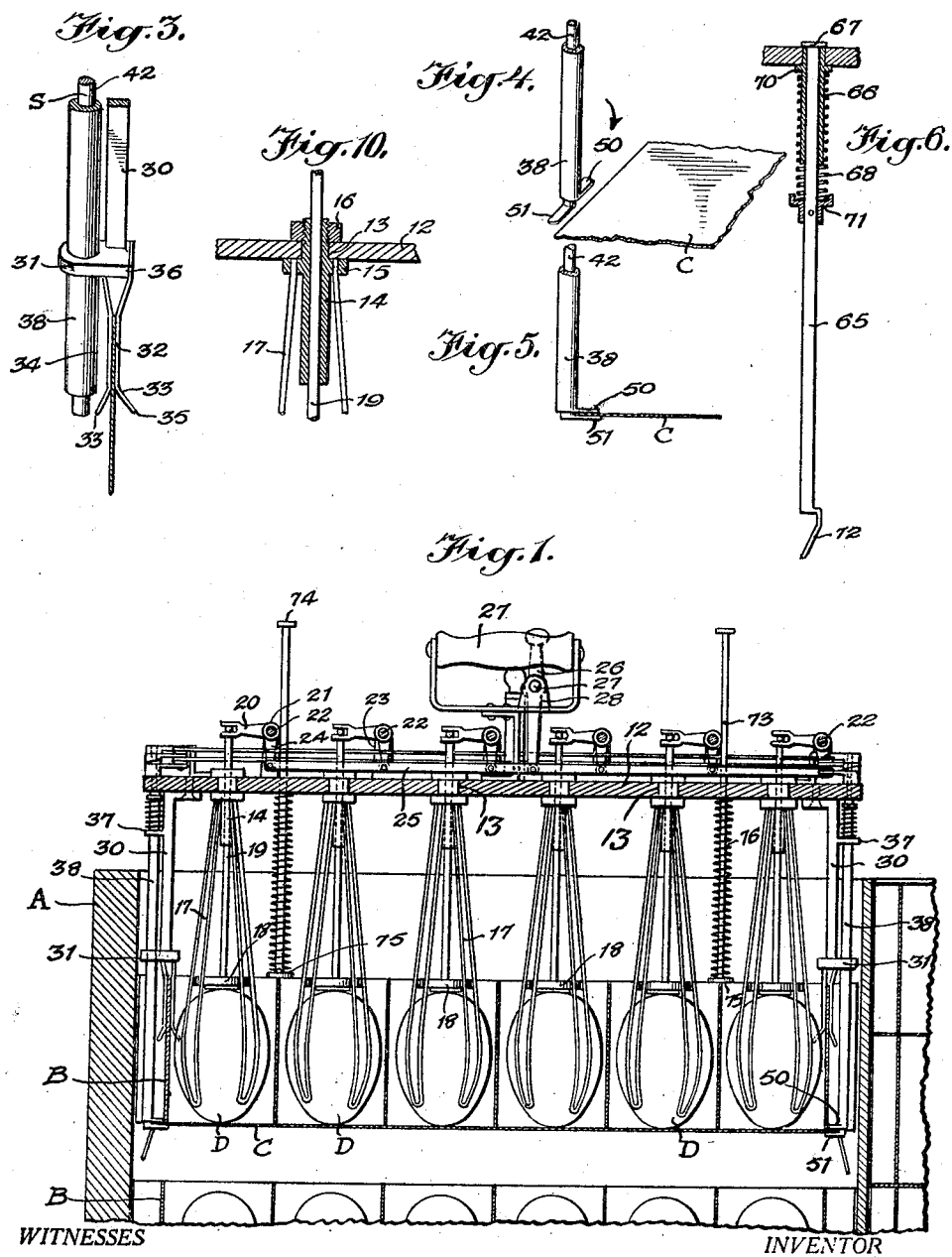

1,500,939

UNITED STATES PATENT OFFICE.

DAVID A. HOWELL, OF BROOKLYN, NEW YORK.

EGG-CRATE UNPACKING AND REPACKING APPARATUS.

Application filed March 20, 1923. Serial No. 626,437.

*To all whom it may concern:*

Be it known that I, DAVID A. HOWELL, a citizen of the United States, and a resident of the city of New York, borough of Brooklyn, in the county of Kings and State of New York, have invented a new and Improved Egg-Crate Unpacking and Repacking Apparatus, of which the following is a full, clear, and exact description.

This invention relates to a packing and unpacking apparatus and has particular reference to a device for facilitating the unpacking of egg crates and subsequent repacking of the same.

At the present time considerable difficulty is experienced in removing eggs from crates together with the filler elements which maintain the eggs in separated relation. In large storage houses the eggs when received in the crates are unpacked, candled and subsequently repacked after the candling operation. This entails considerable labor and time under the present methods in addition to a large percentage of breakage and consequent loss.

It is therefore the principal object of the present invention to provide an apparatus for packing and unpacking an egg crate, by means of which time and labor are saved and breakage from the packing and unpacking operation reduced to a minimum.

As a further object the invention contemplates an egg crate unpacking and repacking apparatus which is so constructed as to permit of the removal of the eggs and filler elements of one layer, the stripping of the filler elements from the eggs, the stripping of the eggs from the apparatus, the subsequent engagement of the apparatus with the eggs, the re-engagement of the apparatus with the filler elements to re-associate the eggs therewith, and the subsequent replacement or repacking of the complete layer in the crate.

As a still further object the invention contemplates a device of the character described which is extremely simple in its construction and mode of operation, inexpensive to manufacture and produce, and thoroughly reliable and highly efficient in its purpose.

With the above recited and other objects in view, the invention resides in the novel construction set forth in the following specification, particularly pointed out in the appended claims and illustrated in the accompanying drawings, it being understood that the right is reserved to embodiments other than those actually illustrated herein to the full extent indicated by the general meaning of the terms in which the claims are expressed.

In the drawings—

Figure 1 is a fragmentary longitudinal sectional view through an egg crate and through the unpacking and repacking device in use and operation.

Fig. 2 is a plan view of the device removed from the crate.

Fig. 3 is a detail fragmentary perspective view of one of the cell structure gripping elements.

Fig. 4 is a fragmentary perspective view of one of the horizontal partition gripping elements prior to the engagement of the same with the partition strip.

Fig. 5 is a fragmentary side view of the same engaged with the partition strip.

Fig. 6 is a fragmentary vertical sectional view illustrating one of the cell engaging and straightening elements.

Fig. 7 is a diagrammatic cross sectional view illustrating the operating means for the filler element gripping means, taken approximately on the line 7—7 of Fig. 2.

Fig. 8 is a similar view taken approximately on the line 8—8 of Fig. 2.

Fig. 9 is a detail collective perspective view of the operating means.

Fig. 10 is a detail fragmentary sectional view of the egg engaging and releasing means.

Fig. 11 is a detail sectional view taken approximately on the line 11—11 of Fig. 2.

Referring to the drawings by characters of reference, A designates an egg crate of the usual construction, B the cell structure and C the horizontal partition strips which are arranged between adjacent superposed cell structures to separate the horizontal layers of egg D.

The device for facilitating the unpacking and repacking of the crate and which constitutes the invention includes a member 12 which is of rectangular configuration and of an area approximately equal to the area of the egg cell structure. The member 12 is provided with a plurality of apertures 13 which correspond in number and arrangement to the axial centers of the cells defined by the cell structure. A bearing sleeve 14 having a shoulder 15 adjacent its upper end is fitted within each opening 13 and secured in place by a nut 16 which is threadedly engaged over the upper end to impinge the shoulder against the under side of the member 12. A plurality of yieldable resilient arms 17 are attached at their upper ends to the shoulder 15 and project downwardly to provide egg engaging jaws. The normal or inherent resiliency of the arms or jaws 17 tends to effect the radial contraction of the several arms about the egg and the means for effecting the radial expansion of said arms consists of an axially movable disk 18 which is carried by a rod 19 mounted for sliding movement in each bearing sleeve 14. An upward movement of the rod 19 and its disk 18 effects a radial expansion of the free ends of the gripping arms to release the egg or to allow for the positioning of the arms over the egg. Preferably four arms 17 are provided for each sleeve, which arms are disposed in such a manner as to enter the egg cell at the corners thereof when the apparatus is to be engaged with the eggs and filler elements. In order to provide means for simultaneously controlling the movement of the rods 19 and their heads or disks 18, the upper ends of the rods which project above the sleeves and the upper surfaces of the member 12 are engaged by the forked arms 20 of bell cranks 21 which are secured to the transverse rock shafts 22 mounted in bearings 23 on the upper face of the member 12. The rock shafts 22 of each transverse row of bell cranks 21 are in turn coupled for simultaneous rocking movement by means of the connection between the remaining arms 24 of the bell cranks with a common oscillatory bar 25. The bar 25 is oscillated by means of a manipulating lever 26 which is pivoted as at 27 to a bearing 28. The bearing 28 is carried by one of the handles 27 by means of which the member 12 is lifted and removed.

The means for engaging and supporting the filler elements B and C consists of a plurality of depending bars 30 at the lower ends of which bearing heads 31 are provided. The bearing heads each have secured thereto a pair of downwardly projecting spring gripper jaws 32 provided with angularly disposed free extremities 33. The depending bars 30 are further provided adjacent their upper ends with a bearing lug 37 and the bearing lugs 37 and the bearing heads 31 are provided with aligned bearing openings. A tubular shaft 38 is mounted for sliding and turning movement in bearing head 31 and bearing lug 37 and extends through an opening 39 in the member 12, the upper end of said tubular shaft projecting above the upper surface of said member 12. An annular shoulder 40 is formed on the tubular shaft above the lug 37 and a coiled expansion spring 41 surrounds the shaft 38 with its opposite ends bearing respectively against the lug 37 and the shoulder 40 to normally effect upward movement thereof. Through each tubular shaft 38 a shaft 42 extends with its opposite upper and lower ends projecting beyond the tubular shaft. The upper end of the shaft 42 is mounted for turning and sliding movement in a bearing bracket 43 secured to the upper face of the member 12 and a collar 44 is secured by a pin 45 to the shaft 42 immediately below its upper end which is journaled in a bracket 43. The collar 44 is provided with a lower cammed face 46 while the upper end of the tubular shaft is provided with a complementary cammed face 47. The upper end of the shaft 38 above the upper surface of the member 12 is further provided with a radially projecting arm 48 and the collar with a radially projecting arm 49, while the lower ends of the shafts 38 and 42 are provided with complementary gripping feet 50 and 51. The arms 48 of each end of the device are coupled for simultaneous movement by a connecting bar 53, while the arms 49 of each end of the device are coupled for simultaneous movement by a connecting bar 54. It will thus be obvious that upon longitudinal movements of the connection bars 53 and 54 in opposite directions as indicated by the arrows in Fig. 7, that the several shafts 48 and 49 will be rotated in opposite directions. A common means for shifting the connecting bars 53 and 54 is provided which consists of a crank shaft 55 having a manipulating handle 56, which crank shaft is journaled in a bearing 57 approximately at the center of the member 12. The crank shaft has secured thereto for turning movement a rock arm 58 which is pivoted at its opposite ends as at 59 to the connecting bars 54. The rock arm 58 is provided with depending pins 60 at opposite sides of the crank shaft 55 which engage in the slotted inner extremities 61 of rock levers 62 which are fulcrumed as at 63 to the upper face of the member 12. The outer ends of the rock lever 62 are pivoted as at 64 to the connecting bars 53 whereby turning movement of the crank shaft 55 by the manipulating handle 56 will rock the arm 58 and levers 62 simultaneously to effect relative longitudinal movement of the connecting bars 53 and 54 in opposite directions.

In use and operation of the device when it is desired to unpack or remove the eggs and filler elements from an egg crate for the purpose of candling or examining the eggs and repacking the same, the manipulating lever 26 is initially shifted to effect a swinging movement of the bell cranks 22 whereby the rods 19 will be moved axially upward. This movement of the rods will simultaneously effect upward movement of the heads or disks 18 at their lower ends to spread or radially expand the egg gripping arms 17 in order to permit of the insertion of the same in the cells of the cell structure B of one layer of the case or crate. Previously to the insertion of the device into the crate the manipulating handle 56 of the crank shaft 55 will be turned to cause the gripper feet 50 and 51 at the lower ends of the shafts 38 and 42 to be disposed in oppositely projecting relation and in a position parallel to the edge of the member 12. At the time of positioning the device, the pairs of spring gripper jaws 32 will be engaged over the outer side walls of the cell structure B to frictionally engage and support the same from the device. To compensate for bulging of the side walls of the cell structure, the angularly disposed free extremities 33 of each pair of gripper arms are provided. The member 12 is further provided with depending arms 65 which extend through bearing sleeves 66 and which arms are provided with heads 67 at their upper ends for limiting their downward sliding movement. A spring 68 engages a shoulder 70 on the bearing sleeve and a spring seat 71 is secured to the arm 65 for normally effecting a downward movement of the arms until arrested by the heads 67. The lower extremities of the arms 65 are provided with cam terminals 72 the purpose of which are to effect an equal spacing of the opposite ends of the horizontal partitions C in order to permit of the passage of the gripping feet 51 therebelow and initially positioning the device with respect to the layer. When the device is in position, the manipulating lever 26 is operated to simultaneously throw the bell crank levers and the rods and heads 19 and 18 to allow the egg gripping elements 17 to engage and support the eggs from the device. The manipulating handle 56 is then operated to turn the crank shaft 55 and rock the arm 58 and levers 62 in an opposite direction whereby the shafts 38 and 42 are turned to cause the gripping feet 50 and 51 to project from the same side. The turning movement of the shafts 38 and 42 with respect to each other will cause the cammed faces 46 and 47 under the influence of the spring to shift the same axially and bring the feet 50 and 51 into gripping engagement with the opposite end edges of the horizontal partition member C. It will thus be seen that the eggs and both of the filler elements are now engaged by and supported from the member 12 whereby the operator may grasp the handles 27 and lift the complete layer including the eggs and the filler elements B and C from the crate A. When it is desired to remove the eggs or place the same on a candling box, the operator first manipulates the horizontal partition gripping means to release the same and then manipulates the egg gripping means to expand the gripper elements and allow the eggs to gravitate onto the candling box. After the candling operation is completed the device is again brought into juxtaposition to the eggs and the egg gripping means manipulated to re-grip the same, after which the horizontal partition member is replaced and re-gripped by the manipulation of the gripping means therefor to permit of the repacking of the layer and release of the gripping elements therefrom. It is of course understood that the horizontal partition member C of the bottommost layer is not necessarily removed and in order to allow for the egg and cell element gripping means to properly operate, the arms 65 which normally project below the plane of the layer will remove upwardly by contraction of the spring 68. In order to strip the cell structure B from the eggs and the device in repacking the crate, a plurality of stripper rods 73 are employed which extend through the member 12 and are provided with heads 74 and 75 at their upper and lower ends, the former heads serving as manipulating elements and the latter serving to engage the upper edge of the cell structure. In practice a light coil spring 76 is interposed between the lower head 75 and the under side of the member 12.

I claim:

1. An egg crate packing and unpacking device comprising a member, means carried by said member for engaging and supporting the eggs therefrom, means carried by said member for engaging and supporting the filler elements therefrom, independent means for releasing the egg and the filler element engaging and supporting means, and means carried by said member for stripping the filler elements from the eggs when said filler element engaging and supporting means is released.

2. An egg crate packing and unpacking device comprising a member, means carried by said member for engaging and supporting the eggs therefrom, means carried by said member for engaging and supporting the filler elements therefrom, independent means for releasing the egg and the filler element engaging and supporting means, means carried by said member for stripping the filler elements from the eggs when said filler element engaging and supporting means is released, and means for stripping the eggs from the egg engaging and supporting means when said latter means is released.

3. An apparatus for packing and unpacking egg crates comprising means for gripping and supporting the eggs of one layer, means for gripping and supporting the cell structure of one layer, and means for gripping and supporting the horizontal partition strip of said layer whereby the eggs and said filler elements may be maintained in relative position during the packing and unpacking operation.

4. An apparatus for packing and unpacking egg crates comprising means for gripping and supporting the eggs of one layer, means for gripping and supporting the cell structure of one layer, means for gripping and supporting the horizontal partition strip of said layer whereby the eggs and said filler elements may be maintained in relative position during the packing and unpacking operation, and means for independently releasing the eggs, the cell structure, and the horizontal partition strip gripping means.

5. An apparatus for facilitating packing, unpacking and repacking of egg crates including means for simultaneously gripping and supporting the eggs, the cell structure and the horizontal supporting and partition strip of one layer whereby to lift and remove the complete layer from the crate for positioning the same within the crate.

6. An apparatus for unpacking and repacking egg crates comprising a member, simultaneously operable means for gripping and supporting the eggs of one layer from said member, simultaneously operable means for gripping and supporting the cell structure of said layer from the member, and simultaneously operable means for gripping and supporting the horizontal partition strip of said layer from the member, whereby the eggs and filler elements are maintained in relative position during the packing and unpacking operation.

7. An apparatus for unpacking and repacking egg crates comprising a member, simultaneously operable means for gripping and supporting the eggs of one layer from said member, simultaneously operable means for gripping and supporting the cell structure of said layer from the member, simultaneously operable means for gripping and supporting the horizontal partition strip of said layer from the member, whereby the eggs and filler elements are maintained in relative position during the packing and unpacking operation, means for simultaneously releasing the gripping means for the horizontal partition strip, and independent means for simultaneously releasing the egg gripping and supporting means.

8. An apparatus for unpacking and repacking egg crates comprising a member, simultaneously operable means for gripping and supporting the eggs of one layer from said member, simultaneously operable means for gripping and supporting the cell structure of said layer from the member, simultaneously operable means for gripping and supporting the horizontal partition strip of said layer from the member, whereby the eggs and filler elements are maintained in relative position during the packing and unpacking operation, means for simultaneously releasing the gripping means for the horizontal partition strip independent means for simultaneously releasing the egg gripping and supporting means, and means for stripping the cell structure from the eggs after the horizontal partition strip gripping means has been released.

9. An apparatus for packing and unpacking egg crates comprising a member including means for gripping the eggs of one layer and supporting the same from said member, said means consisting of a plurality of sets of resilient arms normally adapted to radially contract about the eggs, spreader means for each set of arms, mechanism for simultaneously actuating the spreader means, means for gripping and supporting the cell structure of one layer, and means for gripping and supporting the horizontal partition strip of said layer, whereby the eggs, the cell structure and the partition strip are maintained in relative position during the packing and unpacking operation.

10. An apparatus for packing and unpacking egg crates comprising a member including means for gripping the eggs of one layer and supporting the same from said member, said means consisting of a plurality of sets of resilient arms normally adapted to radially contract about the eggs, spreader means for each set of arms, mechanism for simultaneously actuating the spreader means, means for gripping and supporting the cell structure of one layer, means for gripping and supporting the horizontal partition strip of said layer, whereby the eggs, the cell structure and the partition strip are maintained in relative position during the packing and unpacking operation, said horizontal partition strip gripping means consisting of a plurality of pairs of rotary and axially movable gripping feet, and mechanism for simultaneously actuating the said gripping feet to engage and disengage same with the edges of the partition strip.

11. An apparatus for packing and unpacking egg crates comprising a member including means for gripping the eggs of one layer and supporting the same from said member, said means consisting of a plurality of sets of resilient arms normally adapted to radially contract about the eggs, spreader means for each set of arms, mechanism for simultaneously actuating the spreader means, means for gripping and supporting the cell structure of one layer, means for gripping and supporting the horizontal partition strip of said layer, whereby the eggs, the cell structure and the partition strip are maintained in relative position during the packing and unpacking operation, said horizontal partition strip gripping means consisting of a plurality of pairs of rotary and axially movable gripping feet, mechanism for simultaneously actuating the said gripping feet to engage and disengage same with the edges of the partition strip, and means carried by the supporting member and extending below the gripping feet for spacing the horizontal partition strip from the sides of the crate to permit of the juxtapositioning of the gripping feet with respect to the strip edges.

DAVID A. HOWELL.